United States Patent [19]

Todd

[11] Patent Number: 4,758,027
[45] Date of Patent: Jul. 19, 1988

[54] RECREATIONAL VEHICLE SEWERLINE ADAPTER

[75] Inventor: Harry V. Todd, El Cajon, Calif.

[73] Assignee: Todd Brothers, Inc., El Cajon, Calif.

[21] Appl. No.: 945,901

[22] Filed: Dec. 24, 1986

Related U.S. Application Data

[63] Continuation-in-part of Ser. No. 800,171, Nov. 14, 1985, Pat. No. 4,660,860, which is a continuation-in-part of Ser. No. 855,924, Apr. 25, 1986, Pat. No. 4,688,833, which is a continuation-in-part of Ser. No. 871,489, Jun. 6, 1986, Pat. No. 4,722,556.

[51] Int. Cl.⁴ .................................................. F16L 25/00
[52] U.S. Cl. .................................. 285/177; 285/179; 285/307; 285/394; 285/423; 403/16
[58] Field of Search ...................... 285/11, 12, 7, 177, 285/394, 395, 903, 307, 358, 179, 423; 138/177, 178, 179; 4/323; 403/16, 350, 409.1; 292/58, 59

[56] References Cited

U.S. PATENT DOCUMENTS

| | | | |
|---|---|---|---|
| 2,509,444 | 5/1950 | Mitchell | 285/304 X |
| 2,823,938 | 2/1958 | Eberman et al. | 285/394 X |
| 2,988,755 | 6/1961 | Roland | 285/177 X |
| 3,148,895 | 9/1964 | Jasper et al. | 285/7 |
| 3,411,813 | 11/1968 | Kreuz | 285/394 X |
| 3,760,430 | 9/1973 | Brenden | 285/177 X |
| 3,866,950 | 2/1975 | Skoch et al. | 285/177 X |
| 4,133,347 | 1/1979 | Mercer | 285/299 X |
| 4,173,989 | 11/1979 | Prest | 285/179 X |
| 4,223,702 | 9/1980 | Cook | 285/302 X |
| 4,231,595 | 11/1980 | Knutsen | 285/299 X |
| 4,660,860 | 4/1987 | Todd | 285/903 X |
| 4,688,833 | 8/1987 | Todd | 285/361 X |

FOREIGN PATENT DOCUMENTS 2241741  3/1975  France ................................ 285/903

Primary Examiner—Randolph A. Reese
Assistant Examiner—Anthony Knight
Attorney, Agent, or Firm—Bernard L. Kleinke

[57] ABSTRACT

An adapter for coupling a flexible corrugated drainpipe to a sewage disposal site inlet, includes a hollow tubular member having an opened drainpipe end portion adapted to engage threadably an end of a corrugated drainpipe. A hollow adapter member has an opened rear end portion adapted to be inserted into the disposal site inlet, and an opened upstanding front end portion, receives telescopically in a tight fitting relationship an opened rear end portion of the tubular member to interconnect the two members in fluid communication. A quick release mechanism on the tubular and adapter members enables a user to disassemble the two members by rotating the members axially relative to one another.

14 Claims, 1 Drawing Sheet

U.S. Patent
Jul. 19, 1988
4,758,027
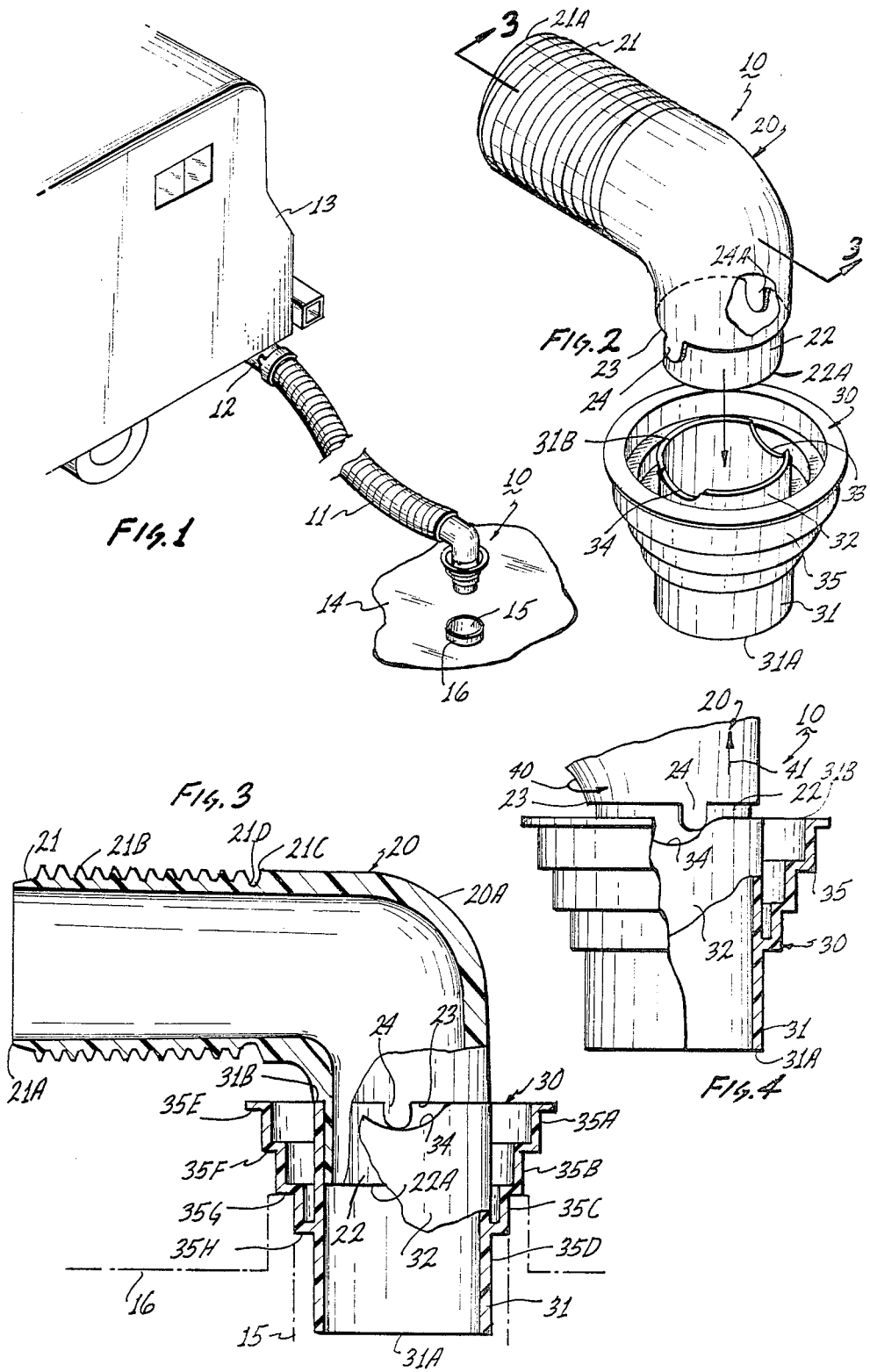

RECREATIONAL VEHICLE SEWERLINE ADAPTER

CROSS-REFERENCE TO RELATED APPLICATIONS

This application is a continuation-in-part of copending U.S. patent application Ser. No. 800,171, filed Nov. 14, 1985 now U.S. Pat. No. 4,660,860, copending U.S. patent application Ser. No. 855,924, filed Apr. 25, 1986 now U.S. Pat. No. 4,688,833, and copending U.S. patent application Ser. No. 871,489, filed June 6, 1986 now U.S. Pat. No. 4,722,556.

BACKGROUND OF THE INVENTION

1. Technical Field

This invention relates generally to flexible pipe adapters, and it more particularly relates an adapter for interconnecting in fluid communication a flexible corrugated drainpipe and the inlet opening of a sewage disposal site.

2. Background Art

In order to maximize enjoyment of recreational vehicles, when parked at a camp site, it is desirable to have a new and improved adapter for coupling the discharge end of a flexible corrugated drainpipe in a convenient manner, to a disposal site inlet. It would be desirable to have such an adapter, which can be rapidly assembled to the drainpipe, and then to the disposal site inlet, with little skill and attention. At the same time, such an adapter should provide a mechanically strong, liquid-tight connection. Moreover, it is desirable to have an adapter, which mates with different disposal site inlet sizes, as well as preventing, or at least greatly inhibiting, the unwanted escape of noxious fumes at the connection to the inlet.

Novel devices with many desirable attributes are described in the foregoing mentioned copending patent applications. For example, one device described in copending patent application Ser. No. 871,489, employs a two-part unit, including a first member adapted to be connected to the drainpipe, and a second member adapted to be inserted into the inlet opening of the sewage disposal site. The first and second members are then interconnected in fluid communication in a friction, liquid-tight fit.

Such a two-part device has several advantages, including disassembly for convenient storage purposes. However, effective as this arrangement is, disengagement of the first and second members is often somewhat difficult. Since the two parts fit tightly together to inhibit the unwanted escape of noxious vapors from the disposal site, they bind together and require additional effort and awkward manipulations to separate them from one another. Consequently, it would be highly desirable to have a new and improved two-piece adapter, which can be readily and conveniently disassembled.

There have been many different types and kinds of couplers and adapters. Refer, for example, to U.S. Pat. Nos. 4,231,595; 3,760,430; 2,988,755; 4,173,989; 4,133,347; and 4,223,702. But, none of the devices described in such patents are capable of solving the rapid disassembly problem associated with a two-part adapter.

SUMMARY OF THE INVENTION

Therefore, the principal object of the present invention is to provide a new and improved two-part adapter, which couples a recreational vehicle flexible drainpipe in fluid communication to a disposal site inlet, in a fast and convenient manner, and which is easy and convenient to install, and disassemble.

It is another object of the present invention to provide such an adapter, which can be used with various different disposal site inlet sizes, and which prevents, or at least inhibits, the escape of noxious fumes at inlet opening, and which is relatively inexpensive to manufacture and provides a liquid-tight, mechanically strong connection.

Briefly, the above and further objects of the present invention are realized by providing a two-part adapter for coupling in fluid communication a flexible corrugated drainpipe to a sewage disposal site.

The inventive two-part adapter includes a hollow tubular drainpipe member having an opened drainpipe end portion of a complementary shape and size adapted to engage threadably a discharge end of a corrugated drainpipe. A second hollow tubular adapter member having an opened rear end portion is adapted to be inserted into the inlet opening of the sewage disposal site. An opened upstanding front end portion, receives telescopically in a friction tight fitting relationship the opened rear end portion of the first tubular adapter member to interconnect the two members in fluid communication, in an L-shaped configuration.

A quick release mechanism on the tubular adapter members enables a user to disassemble the rear end portion of the first member from the front end portion of the adapter member by rotating the two members axially relative to one another.

In use, one member is attached to the drainpipe, and the other member is inserted into the inlet opening. The first member is inserted into the second member in a relatively close fitting manner to secure them in place, in a liquid-tight, mechanically strong manner. Disassembly is achieved by rotating the first and second members relative to one another, to actuate the quick release mechanism for separating the two members. This quickly and easily disengages the two closely fitting members so that the first member can be withdrawn from the first and set aside for storage purposes.

BRIEF DESCRIPTION OF THE DRAWINGS

The above and further objects and features of this invention and the manner of attaining them, will become apparent, and the invention itself will be best understood, by reference to the following description of embodiments of the invention, taken in conjunction with the accompanying drawings, wherein:

FIG. 1 is a pictorial, fragmentary view of a recreational vehicle waste discharge sewerline adapter, which is constructed according to the present invention, and which is shown interconnecting a drainpipe and sewage disposal site inlet;

FIG. 2 is an enlarged pictorial, partially broken away, view of the adapter of FIG. 1, illustrating the two-part adapter in the process of being assembled;

FIG. 3 is a greatly enlarged sectional view of the adapter of FIG. 2, taken substantially on line 3—3 thereof illustrating both adapter parts in the assembled form; and FIG. 4 is a fragmentary, partially sectional elevation view of the adapter of FIG. 2, with a portion broken away, illustrating the cam release mechanism used for disengagement.

DESCRIPTION OF THE PREFERRED EMBODIMENTS

Referring now to the drawings, and more particularly to FIGS. 1, 2, and 3 thereof, there is shown an adapter 10, which is constructed according to the present invention, and which is connected to an end of a corrugated flexible drainpipe 11, extending from a waste discharge pipe 12 of a recreational vehicle 13. Connected in this manner, the adapter 10 is used to interconnect the corrugated drainpipe 11 in fluid communication with a waste disposal site 14 when the adapter 10 is inserted into an inlet 15 defined by the waste disposal site structure 16.

The adapter 10 is generally L-shaped, and is composed of a suitable thermoplastic material. The adapter 10 is of a two-part construction, and includes an elbow member 20, which is a tubular L-shaped member having a hollow interior throughout its length, and which interconnects in fluid communication a waste site inlet member 30. The adapter 10 includes a distal end 21A of an opened drainpipe end portion 21 adapted to be threaded into the discharge end 11. At its opposite end, the adapter 10 includes a distal end 22A of an opened rear end portion 22, adapted to fit within the inlet 15. Disposed between the two opened ends is a 90 degree bend intermediate portion 20A to offset the drainpipe end portion 22 axially from the sewerline rear end portion 22, so that the drainpipe 11 resting on the ground can be connected readily in fluid communication with the inlet 15.

The drainpipe end portion 21 is formed with an integrally-formed screw thread 21B which extends axially spirally along the external surface thereof, and, which threadably mates with the corrugations of the corrugated drainpipe 11. The distal end 21A of the drainpipe end portion 21 is inserted into an end of the drainpipe 11, and the elbow member 20 is rotated about the axis of the drainpipe end portion 21, to thread the end portion 21 into the discharge end of the drainpipe 11.

The drainpipe end portion 21 includes an outwardly extending annular shoulder surface 21C slightly spaced apart from the end of the thread 21B. In order to seal the drainpipe to the adapter 10, the surface 21C serves as an abutment, against which the drainpipe 11 engages as it is threaded onto the drainpipe end portion 21. A recessed portion 21D is disposed intermediate the annular surface 21C and the end of the thread 21B where it receives a distal end portion of the corrugated drainpipe end as the drainpipe is compressed in tight sealing engagement against the annular surface.

The rear end portion 22 of the elbow member 20 is complementary sized and shaped relative to the waste site inlet member 30. The member 30 has a hollow interior throughout its length, to provide fluid communication from the drainpipe 11 and the elbow member 20 to the inlet opening 15 of the sewage disposal site 14. The opened distal rear end portion 31A of the member 30 is sized and shape to be inserted snuggly into the inlet opening 15. An concentrically-disposed opened upstanding tubular front end portion 31B of the member 30 is complementary sized and shaped relative to the rear end portion 22 of the elbow member 20, to receive the rear end portion 22 telescopically in a friction tight fitting relationship and interconnect the elbow member 20 and the adapter in fluid communication.

In use, the rear end portion 31A of the member 30 is inserted into the inlet opening 15, and then the elbow rear end portion 22 of the elbow member 20 is aligned axially with the member 30 and inserted into the front end portion 31B, with slight downward pressure to seat fully and tightly the elbow rear end portion 22 within the front end portion 31B.

A rearwardly facing annular shoulder 23 on the elbow rear end portion 22 is spaced rearwardly axially from terminal end 22A. As the rearward end portion 22 is inserted into the front end portion 31B, the annular shoulder 23 abuts the tubular front end portion 31B to limit axial travel of the elbow member 20 into the member 30.

In order to separate the two members quickly and conveniently, there is provided quick release means in the form of a pair of diametrically-opposed downwardly depending integral cam members 24 and 24A on the rear end portion 22, extend downwardly from the annular shoulder 23 axially toward terminal end 22A. The cam members 24 and 24A each has rounded end portions, which mate with and engage respective ones of semicircularly-shaped cam surfaces 33 and 34 disposed diametrically opposite one another at an upper edge of the front end portion 32 of the member 30, when the two parts are fitted together, as shown in FIG. 3.

When the elbow 20 is inserted into the member 30, the bottom edges of the cam members 24 and 24A move into hitting engagement with the respective cam surfaces 33 and 34. To disassemble the elbow member 20 from the member 30, the user rotates axially the elbow member 20 relative to the member 30 by rotating the elbow member 20 about the axis of rearward end portion 22, as indicated by arrow 40 in FIG. 4. As this is done, the cam members 24 and 24A ride along respective ones of the cam surfaces 33 and 34 to force the elbow member 20 axially upwardly apart from the member 30, as indicated by the axially directed arrow 41. Thus, the cam members coact with the cam surfaces to overcome the frictional force accompanying the tight fitting relationship of rearward end portion 22 and front end portion 32, to facilitate disassembly.

Since all of the parts must fit together in a very tight manner, it would otherwise be difficult to pull the members apart manually. By employing the cam devices, the members can be separated readily.

A nozzle section 35 of the member 30 has an outside diameter, which decreases progressively axially toward the bottom distal end 31A. This enables the rear end portion 31 to generally mate with different size inlet openings. At the same time, the member 30 engages the top edge of the disposal site structure inlet 15 to cover over the inlet opening and block the escape of noxious fumes, in a similar manner to the device of the foregoing mentioned co-pending parent patent application Ser. No. 871,489.

The nozzle section 35 decreases in diameter in discrete steps, and includes four axially stepped body portions 35A, 35B, 35C, and 35D, which are each selected to mate with four of the most popular, conventional disposal site inlets. Thus, the diameter of the body portion at 35A is approximately four inches, and the diameters of the smaller body portions at 43B, 43C, and 43D decrease in diameter by one half inch increments. As indicated in phantom lines in FIG. 3, the body portion 35C has a diameter of three inches, and fits snugly within the three inch diameter circular inlet opening 15.

The nozzle section annular portions 35A-35D extend radially outwardly from the body of the nozzle section, and serve to engage the structure defining the disposal site inlet. In order to cover over the inlet, each one of the portions 35A-35D includes a series of respective upper stepped downwardly-facing annular shoulders 35E, 35F, 35G, and 35H, for engaging and thus covering over the upper edge of four different sized inlets, such as the inlet 15 being covered by the shoulder 35G in FIG. 3.

Thus, the nozzle section enables the member 30 to mate with four different sized inlets, while at the same time engaging the disposal site structure defining the inlet, thereby to cover the inlet.

The illustrated adapter 10 thus defined, features two-part construction, cam action disassembly, and a nozzle section adapted to mate with different size inlet openings, to provide a superior adapter with increased functionality. Various changes may be made in the illustrated embodiment within the inventive concepts herein disclosed. For example, the nozzle section may be composed of a suitable resilient material to enable it to conform to variances in the particular disposal site structure. In addition, the nozzle section may employ a generally continuous transition in the form of a conical configuration, in place of the stepped transition of the illustrated adapter 10.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An adapter for coupling in fluid communication a flexible corrugated drainpipe to a sewage disposal site inlet, comprising:
    a tubular member having a hollow interior throughout its length, said tubular member having an opened drainpipe end portion with a complementary shape and size adapted to engage threadably an end of a corrugated drainpipe, and having an opened rear end portion;
    an adapter member having a hollow interior throughout its length, said adapter member having an opened rear end portion adapted to be removably inserted downwardly into the inlet and having an opened upstanding front end portion for interconnecting telescopically in a tight fitting relationship the opened rear end portion of the tubular member to interconnect the tubular member and the adapter member in fluid communication; and
    quick release means on the tubular and adapter members for driving forcibly the members axially away from one another enabling a user to disassemble said members by rotating the members axially relative to one another.

2. An adapter as recited in claim 1, wherein:
    the drainpipe end portion and the rear end portion of the tubular member are axially offset relative to each other.

3. An adapter as recited in claim 1, further comprising:
    thread means defining a spirally-shaped thread extending axially along the drainpipe end portion of the tubular member so that the thread is complementary sized and shaped relative to the corrugations of the corrugated drainpipe to enable threaded engagement of the corrugated drainpipe.

4. An adapter as recited in claim 1, further comprising:
    sealing means defining an outwardly extending annular surface on the drainpipe end portion of the tubular member slightly facing a distal end of the drainpipe end portion and disposed slightly spaced apart from the thread, for providing a surface to be engaged sealingly by the corrugated drainpipe as it is connected onto the tubular member; and
    a recessed portion of the drainpipe end portion intermediate the annular surface and the thread, for receiving a portion of the corrugated drainpipe end as the corrugated drainpipe is compressed in sealing engagement against the annular surface.

5. An adapter for coupling in fluid communication a flexible corrugated drainpipe to a sewage disposal site inlet, comprising:
    a tubular member having a hollow interior throughout its length, an opened drainpipe end portion with a complementary shape and size adapted to engage threadably an end of a corrugated drainpipe, and an opened rear end portion;
    an adapter member having a hollow interior throughout its length, an opened rear end portion adapted to be inserted into the inlet and an opened upstanding front end portion for receiving telescopically in a tight fitting relationship the opened rear end portion of the tubular member to interconnect the tubular member and the adapter member in fluid communication;
    quick release means on the tubular and adapter members for enabling a user to disassemble said members by rotating the members axially relative to one another; and
    wherein the quick release means comprises cam means defining a cam member and a cam surface on respective ones of the tubular member and the adapter member for forcing the tubular member and the adapter member apart when the tubular member is rotated axially relative to the adapter member, the cam member being disposed to align with the cam surface when the rear end portion of the tubular member is within the front end portion of the adapter member.

6. An adapter as recited in claim 5, wherein:
    the cam member is disposed on the rear end portion of the tubular member; and
    the cam surface is disposed on the front end portion of the adapter member.

7. An adapter as recited in claim 5, further comprising:
    a distal end of the cam member having a semi-circular shape.

8. An adapter as recited in claim 5, further comprising:
    a pair of cam members disposed in diametrically opposing relationship on the exterior of the rear end portion of the tubular member; and
    a pair of cam surfaces disposed in diametrically opposing relationship on the front end portion of the adapter member.

9. An adapter for coupling in fluid communication a flexible corrugated drainpipe to a sewage disposal site inlet, comprising:

a tubular member having a hollow interior throughout its length, an opened drainpipe end portion with a complementary shape and size adapted to engage threadably an end of a corrugated drainpipe, and an opened rear end portion;

an adapter member having a hollow interior throughout its length, an opened rear end portion adapted to be inserted into the inlet and an opened upstanding front end portion for receiving telescopically in a tight fitting relationship the opened rear end portion of the tubular member to interconnect the tubular member and the adapter member in fluid communication;

quick release means on the tubular and adapter members for enabling a user to disassemble said members by rotating the members axially relative to one another; and wherein the rear end portion of the tubular member has a circularly-shaped exterior of a given diameter; and the front end portion of the adapter member has a circularly-shaped interior slightly larger than the specified diameter, to receive the rear end portion of the tubular member telescopically in tight fitting relationship.

10. An adapter as recited in claim 9, wherein:

the rear end portion of the tubular member includes an annular shoulder spaced axially rearwardly from a distal end of said rear end portion; and the cam member protrudes from the annular shoulder toward the distal end.

11. An adapter as recited in claim 9, further comprising:

a pair of diametrically opposite cam members protruding from the annular shoulder toward the distal end.

12. An adapter for coupling in fluid communication a flexible corrugated drainpipe to a sewage disposal site inlet, comprising:

a tubular member having a hollow interior throughout its length, an opened drainpipe end portion with a complementary shape and size adapted to engage threadably an end of a corrugated drainpipe, and an opened rear end portion;

an adapter member having a hollow interior throughout its length, an opened rear end portion adapted to be inserted into the inlet and an opened upstanding front end portion for receiving telescopically in a tight fitting relationship the opened rear end portion of the tubular member to interconnect the tubular member and the adapter member in fluid communication;

quick release means on the tubular and adapter members for enabling a user to disassemble said members by rotating the members axially relative to one another; and nozzle means, including a section at the rear end portion of the adapter member having an outside diameter decreasing progressively toward a distal end of the rear end portion of the adapter member, for enabling said rear end portion to generally mate with different size inlet openings and for engaging the disposal site structure defining an inlet opening into which said rear end portion is inserted, thereby to cover over the inlet.

13. An adapter as recited in claim 12, wherein:

the section of the rear end portion of the adapter member defined by said nozzle means has an outside diameter that decreases toward the distal end of said rear end portion in a series of discrete steps.

14. An adapter as recited in claim 12, further comprising:

closure means defining an annular shoulder extending radially outwardly from said rear end portion at a step in outside diameter, to overlie the disposal site structure defining an inlet into which said rear end portion is inserted and thereby covers the inlet.

* * * * *